United States Patent

[11] 3,558,092

| [72] | Inventor | Lee B. Hanson |
| | | P.O. Box 283, Pittsburgh, Kans. 66762 |
| [21] | Appl. No. | 30,118 |
| [22] | Filed | Apr. 20, 1970 |
| | | Continuation-in-part of application Ser. No. 781,809, Dec. 6, 1968, now abandoned. |
| [45] | Patented | Jan. 26, 1971 |

[54] TRAILER FRAME STABILIZING SUPPORT
11 Claims, 13 Drawing Figs.

[52] U.S. Cl. .................................................. 248/352,
248/354, 280/150.5, 296/23
[51] Int. Cl. ........................................................ B60s 9/00
[50] Field of Search .................................................. 248/351,
352, 354, 357, 121; 280/150.5; 296/1, 23

[56] References Cited
UNITED STATES PATENTS

| 2,519,364 | 8/1950 | Fredholm | 248/352 |
| 2,712,453 | 7/1955 | Dion | 280/150.5 |
| 2,924,463 | 2/1960 | Livermont | 248/351 |
| 2,995,397 | 8/1961 | Eames | 296/23 |
| 3,043,549 | 7/1962 | Wilkinson | 248/351 |
| 3,186,570 | 6/1965 | Bunnell | 248/354 |
| 3,198,486 | 8/1965 | Allen | 248/354 |
| 3,251,494 | 5/1966 | Pulliam | 248/354 |
| 3,275,369 | 9/1966 | Ecke | 296/23 |
| 3,370,817 | 2/1968 | Weber et al. | 248/354 |
| 3,414,916 | 12/1968 | Martin et al. | 296/23MC |

FOREIGN PATENTS

| 543,853 | 3/1942 | Great Britain | 248/354S |
| 1,120,647 | 4/1956 | France | 248/357 |
| 1,127,466 | 5/1956 | France | 248/354S |
| 626,671 | 10/1961 | Italy | 248/121 |

*Primary Examiner*—Marion Parsons, Jr.
*Attorneys*—Keith Misegades and George R. Douglas, Jr.

ABSTRACT: A combined stabilizer and support for the frame of a trailer or the like including two pairs of footed angled strut supports, each removably received in a receptacle and bracket which is mounted on a portion of the trailer frame. The footed strut may be formed of two members, including a primary leg in the bracket and a footed member telescopically received in the primary leg. A toggle lever and/or locking screw system provide multiple, stable positions for extension of the footed member from the primary leg.

PATENTED JAN 26 1971
3,558,092
SHEET 1 OF 4
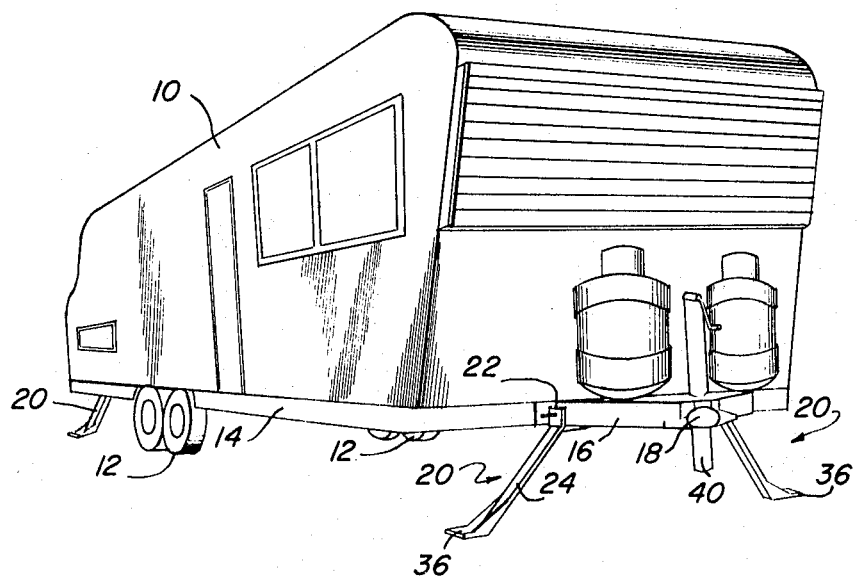
FIG. I
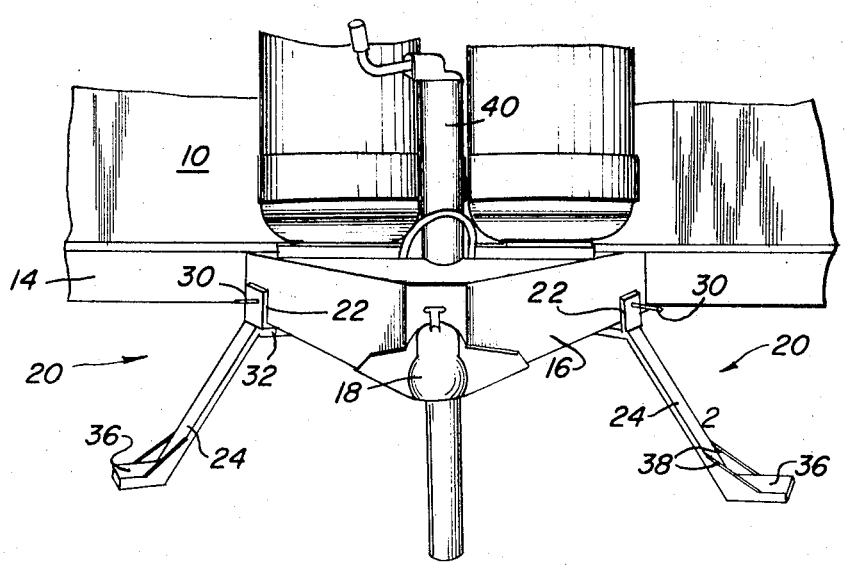
FIG. 2
INVENTOR
LEE B. HANSON
BY Keith Musgades
ATTORNEY

INVENTOR
LEE B. HANSON
ATTORNEY

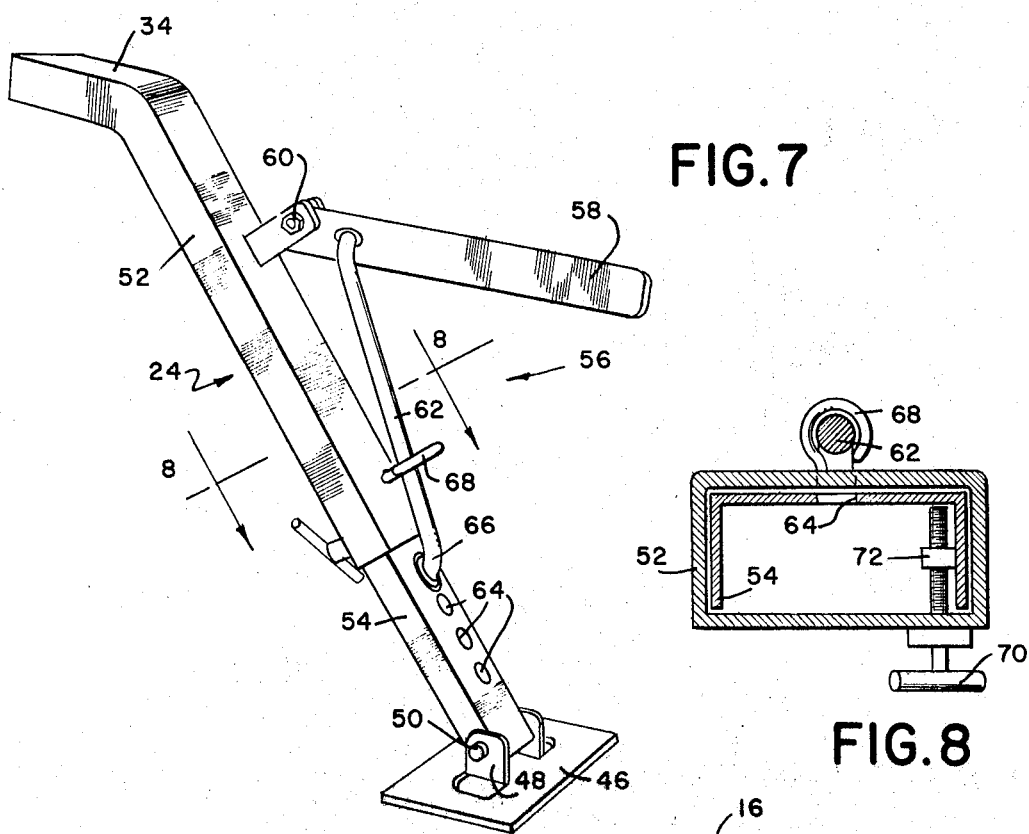
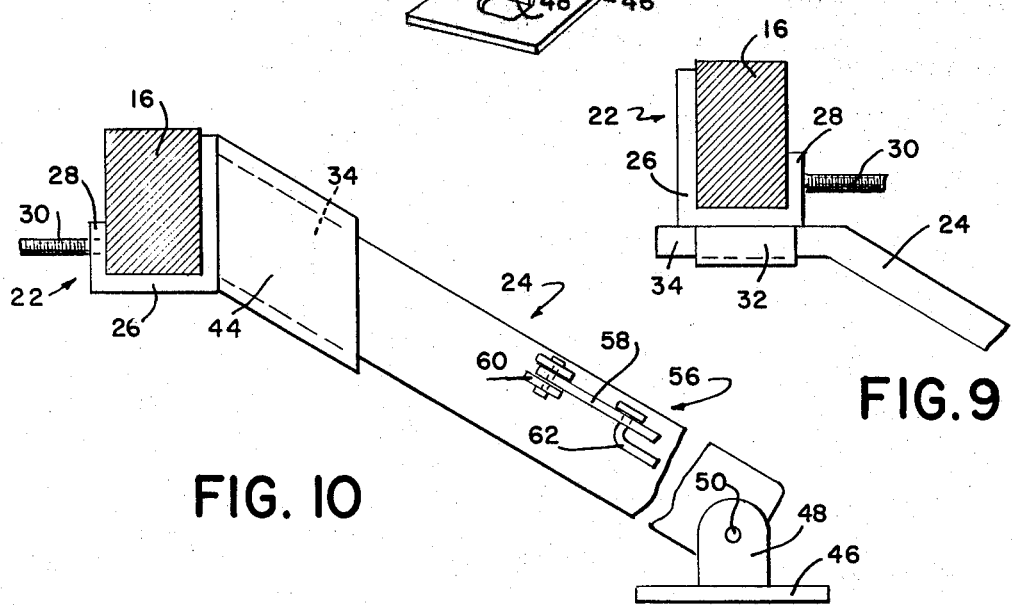

FIG.11
FIG.12
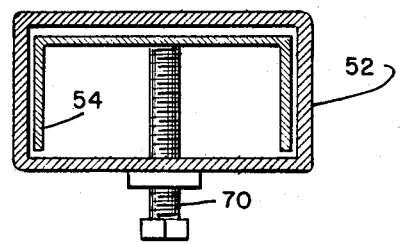
FIG.13
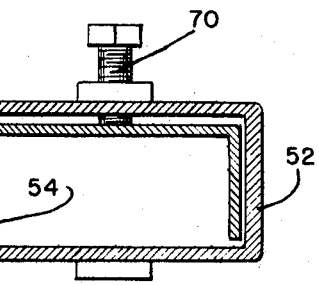
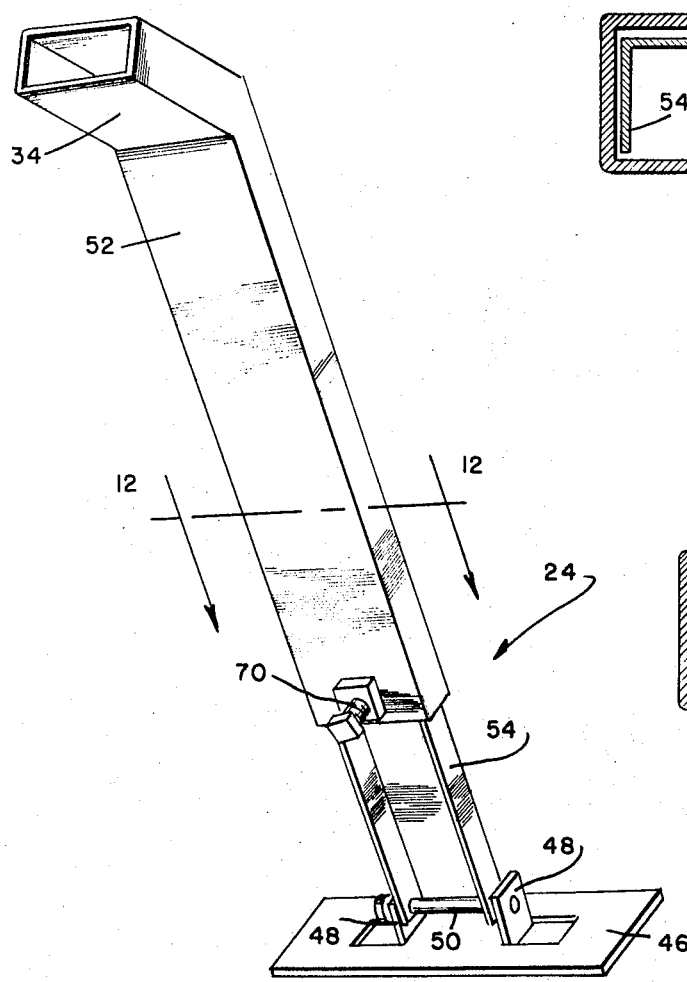
INVENTOR
LEE B. HANSON
BY Misegades & Douglas
Keith Misegades
ATTORNEYS

TRAILER FRAME STABILIZING SUPPORT

CROSS REFERENCE TO RELATED APPLICATION

This is a continuation-in-part of application Ser. No. 781,809, filed Dec. 6, 1968, now abandoned.

BACKGROUND OF THE INVENTION

The invention concerns supports of the type used in stabilizing house trailers when such a trailer is in a stationary position. Of course, the trailer is normally unstable, being mounted on the usual leaf springs attached to one or more wheeled axles when being transported. But when the trailer is to be used as living quarters, it is most desirable that rigid stability be provided with a minimum of inconvenience.

In the usual course of events, house trailers are provided with four corner mounted screwjacks for supporting the trailer when stationary. Aside from expense, their necessary massive weight and difficulty of use makes such supports somewhat undesirable. As an answer, several prior United States Patents are relevant.

U.S. Pat. No. 2,924,463 issued to Frank W. Livermont describes a pair of angled strut supports for a trailer frame tongue only, thereby imparting limited stability to the trailer. The struts themselves require a secure tie therebetween to prevent spreading, and each strut may become dislodged from the bracket into which it is inserted, as each bracket is disposed at right angles to the line of thrust of the strut when supporting the trailer. U.S. Pat. Nos. 3,093,362 issued to Reuben W. Schaefer and 3,146,002 issued to Wallace S. Faber show trailer supports folded to a storage position, but each must be permanently affixed to its storage bracket, to prevent dislodging when in a trailer supporting position, and thus these supports are always subject to effects of the weather. U.S. Pat. No. 3,345,037 issued to Ernest J. Sweetland, Jr., indicates a removable, vertically disposed trailer tongue support, but as such it cannot impart lateral stability to a trailer at rest.

U.S. Pat. No. 2,162,181, issued to Percy A. Skinner illustrates a telescoping trailer strut, but again it is permanently fixed exteriorly of the trailer, and thus always subject to the elements, and the adjusting feature provided permits only very limited adjustment of the telescoping members when the strut is in a supporting position. Finally, U.S. Pat. No. 2,634,941 issued to Clyde V. Eckert illustrates a stowable, angled and telescopically adjustable trailer tongue support, but it is always located exteriorally of the trailer, and the selective vertical adjustment provided is not incremental.

On the other hand, applicant's invention is useful on the four corners of the trailer, and may be removed when the trailer is to be moved, to minimize the effects of the weather. Each strut is mounted angularly, to impart rigid lateral, vertical and lengthwise stability to the trailer. Each strut may be incrementally adjusted in length for exact adjustment of the trailer body, regardless of supporting terrain.

SUMMARY OF THE INVENTION

The invention is a trailer support including a plurality of strut assemblies, each strut assembly having a bracket, a box receptacle for the strut, and an angled strut with a stem portion for insertion into the receptacle, along the line of thrust of the strut to prevent dislodging of the support. The strut may comprise two telescopically fitting members including control means for incremental extension of one member with respect to the other.

BRIEF DESCRIPTION OF THE DRAWINGS

Details of construction and further advantages of the invention will become apparent by reference to the following drawings wherein:

FIG. 1 is a perspective view showing one embodiment of the invention in use;

FIG. 2 is a partial, front elevational view of the portion of one embodiment of the invention used on the tongue of a trailer.

FIG. 7 is a perspective view, showing another embodiment of the invention;

FIG. 8 is a sectional view taken along line 8—8 of FIG. 7;

FIG. 9 is a partial sectional view, similar to the upper left-hand portion of FIG. 4, showing another embodiment of the invention;

FIG. 10 is another partial sectional view, similar to FIG. 4, showing yet another embodiment of the invention;

FIG. 11 is a view in perspective, depicting another embodiment of the invention.

FIG. 12 is a sectional view, taken along lines 12—12 of FIG. 11 and;

FIG. 13 is a sectional view similar to FIG. 12, but showing yet another embodiment of the invention.

DESCRIPTION OF THE PREFERRED EMBODIMENTS

Figure 3:
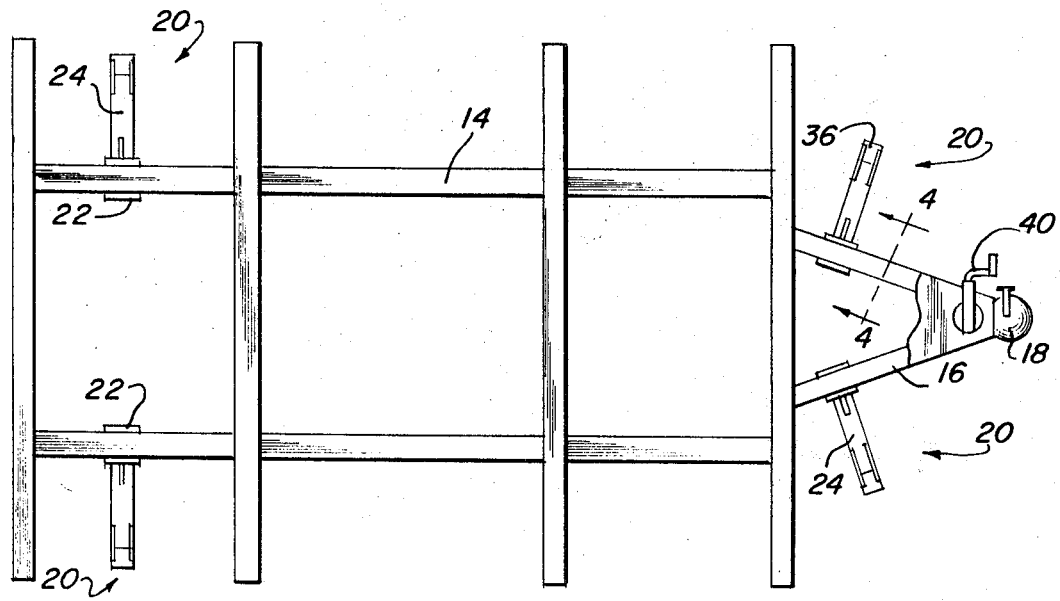
FIG. 3 is a top, plan view of the trailer frame, showing points of attachment of the invention thereto.

Referring now to the drawings by reference character, a standard house trailer 10 is indicated in FIG. 1, including a wheel supports 12, a support frame 14, and a tongue 16 with hitch 18 for hauling the trailer by a powered vehicle (not shown). The instant invention includes four angles strut assemblies 20, 20, 20, 20, one for each rear corner of frame 14, and two for tongue 16 (FIG. 3). Of course, it is not an absolute requirement that four struts be used and only at the positions indicated. More or fewer struts may be employed, depending on the size and stability of the trailer 10, and the surface upon which it rests (not shown).

Figure 4:
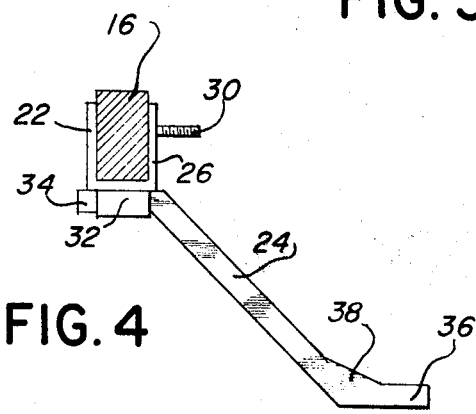
FIG. 4 is a sectional view taken along lines 4—4 of FIG. 3.
Figure 6:
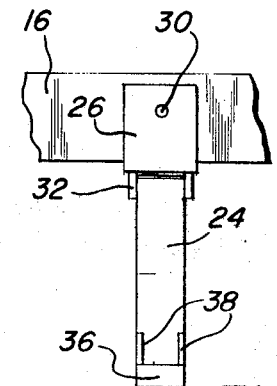
FIG. 6 is a front elevational view of the invention as shown in FIG. 4.

Each strut assembly is of optimum simplicity, including a support bracket 22, and a removable strut 24. Bracket 22 includes a U-shaped portion 26 which is adapted to closely fit three sides of a portion of frame 14 or tongue 16 (FIG. 4). A threaded lock 30, threaded through one vertical stem of U-shaped portion 26 assures secure attachment of the bracket 22. Pin 30 may be headed to receive a wrench, or alternately, be provided with a winged head for hand threading of the pin (not shown). FIGS. 9 and 10 illustrate other forms of bracket 22 wherein one stem 28 of U-shaped portion 26 is shorter than the other, pin 30 being threaded therethrough. A saving in material cost is realized and pin 30 is more accessible due to its lower placement.

Figure 5:
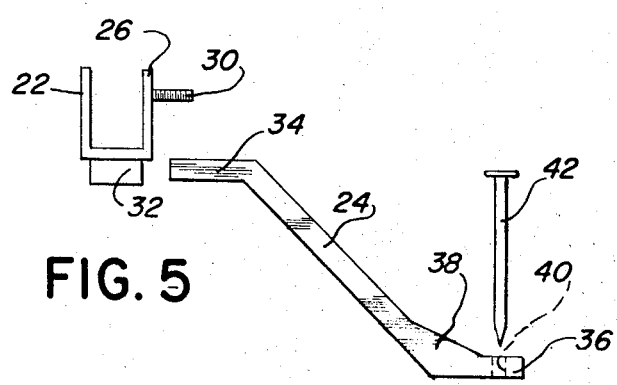
FIG. 5 is an exploded view of the invention as illustrated in FIG. 4.

A box receptacle 32, for receiving strut 24, is welded to the horizontal base of the U-shaped portion 26, or it may formed as an integral member of bracket 22. In either event, the internal dimensions of receptacle 32 match the external dimensions of angled stem 34, formed at the upper end of strut 24. As indicated by FIGS. 4 and 5, stem 34 merely slides into and out of receptacle 32. Another form of bracket 22 and stem 34 is illustrated in FIG. 10. Here, stem 34 is formed with an extension of strut 24, coincident with the length thereof while a receptacle 44 is formed or welded on one vertical stem 46 of U-shaped portion 26, and comprises an open ended box. Strut 26 may be rotated one-quarter turn, with respect to the position illustrated in FIG. 7, to impart even further rigidity to the support. In each embodiment, the support thrust of strut 24 forces stem 34 into snug engagement with receptacle 32 or 44, so that dislodgment of the strut from its receptacle is prevented when strut assembly 20 is in a stabilizing support position. On the other hand, strut 24 may be easily removed by merely withdrawing it from its receptacle since there is no positive interlock between these members. The strut 24 may be stored elsewhere, when not in use, preferably inside a trailer 10, to minimize the deteriorating effects of the weather.

The lower end of strut 24 includes a foot support 36, formed at the same angle with respect to strut 24 as is stem 34, received in receptacle 32. The junction of foot 36 and strut 24 may be reinforced by a pair of suitable braces 38, 38, formed as plates, and welded in place, or integrally formed as part of the strut 24.

FIG. 5 indicates that foot 36 may be bored, as at 40, to receive a pin or stake 42 which may be used to stabilize strut 24 when in place, particularly when the trailer 10 is located on grass or earth.

Another arrangement of the lower end of strut 24 is shown in FIG. 7 and 10. A foot 46 is pivotally mounted on the lower, distal end of strut 34 by means of a pair of stamped, upstanding ears 48, 48 on foot 46, a pin 50 bored through ears 48, 48 and strut 24.

Another arrangement of strut 24 is best illustrated by FIGS. 7, 8 and 10. Two telescoping members 52 and 54 comprise strut 24, member 54 fitting within member 52, which has stem 34 formed at its upper, free distal end. Control means 56 for selective extension of member 54 include a handle 58, pivotally mounted on member 52 at 60, a toggle arm 62, pivotally secured on the handle, and a plurality of bores 64 formed in member 54, for selective engagement with the curved lower free end 66 of arm 62. A centering guide 68 may be mounted on the top member 52, about arm 62, to control its movement as handle 58 is depressed.

With strut 24 in place on bracket 22, handle 58 may be raised to the position shown in FIG. 7 and the end 66 inserted into one of the bores 64. Depression of handle 58 towards members 52 and 54 then causes member 54 to be extended. If further extension is required, the process may be repeated. Following depression of handle 58, member 54 may be latched to member 52 by a screw 70, threaded through member 52 (FIG. 8) to retain the extended position obtained by a previous depression of handle 58. It is to be noted that member 52 comprises a box beam while member 54 is formed from a channel beam. A lug 72, welded to or formed interiorally on member 54 prevents separation of the members 52 and 54 by abutting screw 70. In the event that it is desired to latch member 54 in midstroke, between full depressions of handle 58, or somewhere between the distance of one bore 64 to the next, screw 70 may be tightened while handle 58 is in midstroke. Thus member 54 may be secured in an infinite number of extended positions with respect to member 52. However, usually one of the positions provided by one of the bores 64, with handle 58 is a fully depressed position, will suffice.

The operation of the invention is almost obvious from the description of its parts. Once a stable location for trailer 10 is determined, struts 24, which are stored elsewhere on the trailer during transport, are employed first by inserting the rear pair of struts 24, 24 into their brackets 22, 22. If necessary, wooden blocks (not shown), may be inserted beneath feet 36, 36, particularly when the trailer is to rest on grass, or unpaved, unstable area (not shown). Then tongue 16 is lifted by means of the standard screw jacks 40, which is a usual item on such trailers. The forward pair of struts 24, 24 are then inserted into brackets 22, 22. Again, wooden blocks may be used beneath feet 36, 36. Finally, screwjack 40 is operated to lower tongue 16 onto struts 24, 24, and thus a stable support is provided for the trailer. If desired, pins 42 may be driven through holes 40 in feet 36 to secure each strut 24 in place.

When the embodiment of the invention employing the telescoping strut is used, the wooden blocks that may be required beneath feet 36, 36 of the first embodiment will not be needed. Instead, control 56 is used in the manner described to extend member 54 sufficiently to stabilize the trailer 10.

In FIGS. 11 through 13, a form of the invention is shown which is similar to that depicted in FIG. 7, in that strut 24 includes telescoping members 54 and 52 but the control means 56 is not provided. Leg member 54 is merely said inwardly or outwardly with respect to member 52, until the proper adjustment is reached, and lock screw 70 (FIG. 12) is then tightened. Lock screw 70 may be located on either side of the device, as shown in FIG. 13. It will be noted that lug 72 does not appear in FIGS. 11, 12, and 13; it may be mounted therein as shown in FIG. 8 if desired.

Various improvements are obvious and well within the scope of this invention. Brackets 22, 22, 22, 22 may each be welded into place on the trailer, thus dispensing with the need for a pin 30. Normally, steel will be used for construction, but other materials may be employed. The most important advantage of the invention is the provision of an easily operable, trailer support having removable leg struts, which may be stored away when the trailer is moved, the support then having no movable working parts subject to the corrosive effects of the weather or loss during transport.

I claim:

1. A support system for stabilizing a trailer frame against side sway including a plurality of strut assemblies, each strut assembly comprising:
    a. a bracket having a noncircular receptacle formed thereon, the bracket being securable to said frame; and
    b. a support leg having means slidably insertable into said receptacle, comprising:
        1. an elongate strut arranged to depend angularly from said bracket;
        2. a short stem, formed to snugly fit the bracket receptacle, at the upper end of the strut; and
        3. a flat, ground-engaging pad integrally formed at the lower end of strut, the plane of the pad lying substantially parallel to the plane of thrust of the stem.

2. The invention as recited in claim 1 wherein the pad and strut are provided with additional bracing plate means to strengthen the area of connection.

3. The invention as recited in claim 3, wherein said one flange is shorter than the other of said two flanges.

4. The invention as recited in claim 1 wherein said stem is attached to the strut at an angle thereto and comprises a generally rectangular member and said receptacle is attached horizontally beneath the bracket and comprises a generally open ended box shaped member, the internal dimensions of the box member and the external dimensions of the rectangular member being approximately coincident, whereby the rectangular member snugly fits into the box member.

5. The invention as recited in claim 1 wherein said pad includes means defining a generally vertical bore therethrough, for receiving a pin for securing the foot to a surface upon which the trailer frame rests.

6. The invention as recited in claim 1 wherein said strut comprises;
    a. two telescopically-fitting members; and
    b. control means for selective extension of one of said two members with respect to the other.

7. The invention as recited in claim 7 wherein said strut further comprises threaded clamping means for latching said two members together.

8. The invention as recited in claim 8 wherein said threaded clamping means further includes lug means, cooperating with said clamping means for preventing separation of said two members.

9. The invention as recited in claim 7 wherein said control means comprise:
    a. a handle, pivotally mounted on one of two said members;
    b. a latching toggle arm, pivotally mounted on the handle; and
    c. means defining a plurality of bores in the surface of the other of said two members, arranged to selectively receive the free end of said toggle arm;

whereby engagement of one of said bored with said toggle arm free end, and depression of the handle towards said one member, said other member is incrementally extended from said one member.

10. The invention as recited in claim 10 wherein said one member is provided with guide means mounted thereon, about said toggle arm, for controlling movement thereof.

75